US008882007B1

(12) United States Patent
Smith et al.

(10) Patent No.: US 8,882,007 B1
(45) Date of Patent: *Nov. 11, 2014

(54) PROCESS FOR RECOVERING AND REGENERATING LITHIUM CATHODE MATERIAL FROM LITHIUM-ION BATTERIES

(71) Applicant: Retriev Technologies Incorporated, Anaheim, CA (US)

(72) Inventors: W. Novis Smith, Philadelphia, PA (US); Scott Swoffer, New Castle, DE (US)

(73) Assignee: Retriev Technologies Incorporated, Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/086,605

(22) Filed: Nov. 21, 2013

(51) Int. Cl.
*B02C 11/08* (2006.01)
*H01M 10/54* (2006.01)
*B02C 23/18* (2006.01)
*B02C 13/00* (2006.01)
*B02C 21/00* (2006.01)

(52) U.S. Cl.
CPC ............... *H01M 10/54* (2013.01); *B02C 23/18* (2013.01); *B02C 13/00* (2013.01); *B02C 21/00* (2013.01)
USPC .................................. 241/21; 241/23; 241/30

(58) Field of Classification Search
USPC .................................. 429/49; 241/21, 23, 30
See application file for complete search history.

(56) References Cited

U.S. PATENT DOCUMENTS

| | | | |
|---|---|---|---|
| 5,345,033 A | 9/1994 | McLaughlin | |
| 5,888,463 A | 3/1999 | McLaughlin et al. | |
| 8,616,475 B1 * | 12/2013 | Smith et al. | 241/21 |
| 2009/0229413 A1 | 9/2009 | Kakuta et al. | |
| 2012/0240729 A1 | 9/2012 | Verscheure et al. | |
| 2013/0287621 A1 | 10/2013 | Fujita et al. | |

* cited by examiner

*Primary Examiner* — Stewart Fraser
(74) *Attorney, Agent, or Firm* — RatnerPrestia

(57) ABSTRACT

The present invention related to a method for the recycling of batteries by recovering and regenerating the cathode material. The method includes the steps of isolating the cathode particles and then regenerating the cathode particles for use in the same type of battery.

11 Claims, No Drawings

PROCESS FOR RECOVERING AND REGENERATING LITHIUM CATHODE MATERIAL FROM LITHIUM-ION BATTERIES

FIELD OF THE INVENTION

The present invention relates to the field of battery recycling, specifically lithium-ion battery recycling. It provides a method of recovering and regenerating lithium cathode material from lithium-ion batteries. The invention provides a satisfactory recycle and disposal procedure for lithium-ion batteries as they reach the end of their battery life.

BACKGROUND OF THE INVENTION

The use of rechargeable lithium-ion batteries is growing steadily for many applications including its use in electric vehicles (EV) and Plug-in Hybrid Electric Vehicles (PHEV). Lithium-ion batteries are also being used for electrical grid network energy storage and many other larger scale applications. Rechargeable lithium-ion batteries are already the dominant battery for mobile devices such as cell phones and computers. The method of this invention will mitigate a potential for scarcity of these battery materials.

As these batteries reach their end-of-life, there is a need to provide a satisfactory recycling and disposal procedure for them. This is particularly accurate for the large size prismatic batteries which are made for automotive and grid-storage applications. These large format batteries, and their respective cells, contain anodes which may comprise carbon coated on copper foil and cathodes which may comprise expensive lithium metal oxides such as lithium cobaltate, mixed lithium nickel/manganese oxides, lithium cobaltate/manganese/nickel oxides and related cathode materials on aluminum foil.

Currently, there are two recycling processes being used for lithium-ion batteries: 1) batteries are processed with an electric furnace already containing molten steel with the contained anode reducing carbons along with the separators and with flux to enrich the forming stainless steel alloy in cobalt, nickel and/or manganese. The lithium is fluxed into the slag and may be recovered at high cost with several extra processing steps (Umicore process, described in US20120240729 A1); and 2) batteries are processed with a hammer mill and the screened −25 mesh slurry filtered and packaged. The slurry contains about 30% metals from the cathode along with the carbon. This metal rich mixture is shipped to an electric smelter for utilization in making steels. The copper and aluminum foils are separately recovered from the process (Toxco, Inc. U.S. Pat. No. 5,345,033 and U.S. Pat. No. 5,888,463). Although the valuable cobalt and nickel is recovered along with the manganese for scrap metal prices, the full value of the lithium metal oxide cathode material is lost and usually there is no recovery of the lithium.

These processes are expensive and cumbersome and, with respect to lithium-containing recoverable materials, generate low yields of such recoverable materials. Another recycling process being used involves the roasting of lithium-ion secondary batteries, described in U.S. Patent Application No. 2013/0287621. This process is expensive, and does not recover the full value of the recoverable materials.

It would therefore be a major improvement in the recycling of battery materials if the full value of the lithium-containing recoverable materials could be achieved by complete recovery and regeneration for direct reuse in a new lithium-ion battery. In addition, almost all of the lithium would also be recovered in the cathode material and remain as part of the lithium metal oxide cathode as it is regenerated and used in the new battery. The recovery and reuse of the cathode material would lessen pressure on the supply of lithium cathode materials like nickel and cobalt.

SUMMARY OF THE INVENTION

This invention provides a safe and economical method of recycling lithium-ion batteries, specifically by recovering and regenerating lithium cathode material from the batteries. One aspect of the invention provides methods for producing lithium metal oxides by recycling any lithium-ion battery, whereby the lithium metal oxides may be isolated for use as cathode materials. Such lithium metal oxides may be efficiently regenerated to new lithium cathode materials in at least about 95% purity. This new lithium cathode material is suitable for direct use into the same type of new lithium battery from which it came. The same process can also isolate the copper, aluminum, and carbon separately.

In one aspect of the invention, the method may comprise: 1) crushing lithium-ion batteries under at least one of a water spray and nitrogen to provide a slurry comprised of water, coarser plastic and metal case parts and finer carbon and cathode particles; 2) screening the slurry from step 1) to separate the coarser plastic and metal case parts from the finer carbon and cathode particles to provide a screened slurry comprised of water and only finer carbon and cathode particles with no metal particles; 3) separating the finer carbon and cathode particles in the screened slurry from at least a portion of the water; 4) heating the finer carbon and cathode particles separated in step 3) which typically contains binder in the presence of molecular oxygen at a temperature of at least 400° C. and not over 700° C. to provide a mixture; 5) performing a froth flotation separation on the mixture from step 4) in a stirred flotation vessel, wherein carbon particles present in the mixture float to a surface of the stirred flotation vessel and are removed; and 6) isolating the cathode particles which remain in the stirred flotation vessel after step 5).

In another aspect of the invention, the methods may further comprise steps to regenerate the cathode particles including adding sufficient lithium hydroxide solution to correct a stoichiometric lithium deficiency; heating to above 400° C. (preferably to 700-815° C.) in air; cooling to ambient temperature; and milling and screening to an appropriate particle size (>5 μm and <25 μm).

DETAILED DESCRIPTION OF THE INVENTION

This invention provides a method of recovering and regenerating lithium cathode material from lithium-ion batteries. This method has applicability in many areas such as battery recycling, although its use is not limited to such. Further, the method is not limited to lithium recovery, it can also be effectively used to recover copper, aluminum or carbon, but is not limited to recovery of only these elements.

The invention provides a route to separate and purify the valuable cathode materials from lithium-ion batteries for reuse in batteries which involves the wet crushing of the used batteries, then wet screening to remove the coarser electrode foils, plastic and separators from the slurry of the mixed fine electrode materials, comprising the lithium metal oxides and mixed oxides and carbon anode materials. For each processing run, only one cathode type of lithium-ion battery is processed in order to have only one type of lithium-ion cathode material in the slurry mix. This invention, however, is not limited to the processing of only one cathode type of lithium-ion battery at a time. Multiple types of lithium-ion batteries may be processed at the same time, if the different lithium-ion cathode materials are desired to be mixed in the slurry.

The lithium-ion cathode material can be any lithium cathode material for use in a battery. Preferably the lithium-ion cathode material is lithium cobaltate, lithium manganate, or lithium nickelate or these lithium mixed metal oxide cathode materials consist of various mixed metal oxides containing various compositions of nickel, manganese, and/or cobalt, for example such as $Li(MnNi)_{1/2}O_2$, $Li(MnNiCo)_{1/3}O_2$ and related species, however the invention is not limited to such.

The process of the invention comprises two basic steps, selective isolation of the cathode particles, and regeneration of said cathode particles. First, the isolation step comprises crushing the batteries under a water spray or under nitrogen or both; screening the coarser plastic and metal case parts and foil away from the finer carbon and cathode particles in the resulting slurry; filtering and drying (furnacing) this slurry and heating it above 400° C., preferably between 400° C. and 500° C. in air or an oxygen-containing atmosphere to destroy the binder and modify the surface of the carbon; performing a froth flotation separation on this mix in a stirred flotation vessel, whereby the carbon particles actively float to the surface of the stirred flotation vessel and are removed: isolating and filtering the sinks or the dense remaining cathode solids from the flotation tank. Next, the regeneration step comprises analyzing the cathode solids for contained lithium; adding sufficient lithium hydroxide solution to the mass to make up for any stoichiometric lithium deficiency in the isolated cathode particles; and heating the wet lithiated cathode slurry mass to above about 400° C., preferably to at least 600° C., and more preferably to at least 700° C., in the presence of oxygen. The resultant lithium cathode material can then be cooled and then milled and screened to the appropriate particle size (>5 and <25 μm). Following, each step will be described in greater detail.

1) Crushing the batteries under a water spray or under nitrogen or both;

This step can be carried out using a number of commonly known crushing techniques. These include but are not limited to crushing the entire battery in a crusher, shredder, or hammer mill. The battery should be wet crushed using a water spray or under nitrogen or both during the crushing process. This wet crushing should provide a slurry comprised of water, coarser plastic and metal case parts and finer carbon and cathode particles.

2) Screening the coarser plastic and metal case parts and foil away from the finer carbon and cathode particles in the resulting slurry;

This separation can be performed via sieve or other well-known filtration techniques including, but not limited to, a shaker table with a grid panel and a mesh screen. This step will provide a screened slurry comprised of water and finer carbon and cathode particles. The finer particles can then be separated from at least a portion of the water, using well known techniques for doing so.

3) Filtering and drying (furnacing) this slurry and heating it above 400° C., preferably between 400° C. and 500° C. in air or an oxygen-containing atmosphere to destroy the binder and modify the surface of the carbon;

The fine slurry after screening, preferably through −140 mesh, from step 2 should then be filtered and heat treated in air or other oxygen-containing atmosphere to destroy the binder which prevents separation by froth flotation. Filtration can be done using any well-known filtration techniques. The heat treatment should be between 400° C. and 600° C. The heat treatment must above 400° C. in air or controlled oxidizing atmosphere to effectively destroy the binder and modify the surface of the carbon. If this step is not carried out above 400° C., it will be ineffective in oxidizing the binder material which typically is an organic polymer such as styrene-butadiene rubber or polyvinylidene fluoride. The temperature should be not be over 600° C. because it will ignite the contained anode carbon. Preferably the heat treatment is between 400 and 550° C., even more preferably between 450 and 500° C. and even more preferably at about 500° C. This treatment should be carried out for at least about 30 minutes, preferably for at least about 1 hour, more preferably for about 2 hours. Preferably this step is carried out in the presence of a limited amount of oxygen with nitrogen but is not limited to such. The step can also be carried out in an air containing atmosphere. This step should be effective in destroying any binder which is present and/or modifying the surface of the carbon particles. This step is of primary importance in the process of the invention to recover the most pure lithium-ion cathode material suitable for reuse in lithium-ion batteries.

4) Perform a froth flotation separation on this mix from step 3) above in a stirred flotation vessel, whereby the carbon particles actively float to the surface of the stirred flotation vessel and are removed;

After heat treatment, the mixed electrode material is optionally allowed to cool to room temperature. This material is then slurried with distilled water in a flotation cell and conditioned for at least about 10 minutes, preferably at least about 20 minutes, and even more preferably at least about 30 minutes with a mixer. Optionally a separation and frothing aid can be added with agitation. Conventional frothing techniques can be used to perform this step. Preferably frothing is carried out by bubbling nitrogen or air into the sample to allow frothing and foaming to occur in a controlled manner. If a mixer is used, the mixing speed should increase during the frothing period. Treatment in the flotation cell should be less than 30 minutes, more preferably less than 25 minutes, and even more preferably about 20 minutes, to allow for the optimal amount of slurry to form. Frothing should be carried out until foaming has diminished. The resulting froth will be comprised of carbon particles. The froth should be collected with conventional collection techniques until the froth ceases to form. The carbon can be recovered from the froth and purified by acid extraction.

5) Isolate and filter the sinks or the dense remaining cathode solids from the flotation tank;

This isolation of cathode particles can be carried out by any well-known method of filtration and isolation.

6) The cathode solids are analyzed for contained lithium, and sufficient lithium hydroxide solution is added to the mass to make up for any stoichiometric lithium deficiency in the isolated cathode particles;

The resulting sinks should contain more than 80% of cathode material, preferably 90-95% of the cathode material. The resulting froth should contain about 90% of the anode carbon present in the initial batteries, preferably about 95% of the anode carbon. The isolated cathode material is then mixed with enough lithium hydroxide solution to replenish the lithium needed to restore the necessary lithium level in the cathode material, usually about 1 to 2% lithium needed by weight of cathode. This step provides lithiated cathode particles.

7) The wet lithiated cathode slurry mass from step 6) is heated to above about 400° C., preferably to at least 600° C., and more preferably to at least 700° C., in the presence of oxygen. The resultant lithium cathode material is then cooled and then milled and screened to the appropriate particle size.

The cathode material is heated in air to preferably above 700° C. but not over about 900° C. This prevents sintering or fusion in order to maintain the original fine particle size. Preferably the cathode material is heated to between 700 and 800° C. Even more preferably the cathode material is heated to between 700 and 750° C. The oxygen needed can be supplied by 70% $N_2$/30% $O_2$. Atmospheric air can also be used to supply the oxygen to the furnace. The cathode material is heated for a period of more than 1 hour, preferably for a period of about two hours. The resultant material is then cooled to room temperature and then screened to the appropriate particle size. Such screening can be accomplished by passing through a #200 mesh screen, although it is not limited to such, and any commonly known screening techniques can be used. Preferably the resulting particle size is greater than 5 and less than 25 μm, although this may be modified based on the type of lithium-ion battery. The resultant lithium cathode material is comprised of lithium metal oxides. The product of this step is then ready to be used as the cathode material in a new lithium-ion battery.

The present invention will now be described with reference to the following examples, which serve to illustrate the various embodiments of the present invention and are not intended to be limiting. The skilled person will appreciate that modifications are within the spirit and scope of the invention.

Example 1

Preparation of Used Lithium-Ion Batteries

Used lithium-ion batteries are broken down through use of a hammer mill. 10.7 kg of commercial rechargeable lithium-ion batteries from one manufacturer were used for this processing run. In this case the hammer mill is equipped with an 8 horsepower motor, with a blade rpm rating of 1800. Once the batteries passed through the hammers, the chopped material was then poured through ⅜ inch punch plates at the bottom of the hammer mill. The batteries were passed through the hammer mill with a water stream under nitrogen. Additional separation of material occurred as the material fell onto a shaker table situated underneath the hammer mill. The shaker table was equipped with a ⅛ inch grid panel sitting over top a US#25 mesh screen. The −25 mesh was slurried with the water from the mill. This slurry was then put through a separate −140 mesh screen as a final means of separation of the fine cathode and anode particles. This −140 mesh slurry was filtered and the filter cake was placed in metal trays into a furnace. The furnace heated in air for one hour at 500° C.

Example 1(a)

This example used 14.9 kg of commercial rechargeable lithium-ion batteries which were from one manufacturer. In this case the hammer mill is equipped with an 8 horsepower motor, with a blade rpm rating of 1800. Following passage through the hammer mill with a water stream under nitrogen, the material was filtered and the filter cake was put into Hastalloy trays and placed into two Barnstead-Thermolyne Series#62700 furnaces. The material was then heated to 500° C. and held at this temperature for one hour under atmospheric conditions which allowed for oxidation of the binder. The material was then allowed to cool and was ready for flotation separation into carbon and the sinks.

The following Examples 2-5 demonstrate flotation tests performed on both furnaced and non-furnaced mixed electrode materials, illustrating the importance of the furnacing step, and the process requirements. The recovered weights of both float and sink returns and the corresponding cobalt analysis of the sinks (cathode material) and floats (anode carbon) were the criteria used in determining the success of the process.

Examples 2-5 are flotation examples using −140 mesh mixtures of electrode materials recovered from crushed lithium-ion batteries.

Example 2

Flotation Example Using Furnaced Mixed Electrode Material

Preliminary Conditions—
The recovered electrode mix material used for this flotation had been screened through US#140 mesh and was furnaced at 475° C. under atmospheric conditions for two hours.
Test Description—
A 52 g sample of this material was slurried in 500 ml of distilled water in a 500 ml plastic bottle, modified for flotation use. Mixing was performed using an Arrow bench-top mixer. 1.5 ml each of o-xylene and 4-methyl-2-pentanol were added as separation and frothing aids. A 20 minute conditioning time was applied. Upon conclusion of conditioning, nitrogen gas was bubbled into the sample to allow for frothing and foaming to occur in a controlled manner and continued for 23 minutes. After this time, foaming had diminished to the point where the test was concluded.
Weight returns: floats=16.67 g, sinks=31.36 g
Cobalt analysis (as % of Co): floats=15.0, sinks=47.6
Theory for $LiCoO_2$ is 60.0% Co. However there is about 12% conductive carbon and binder content which then lowers this number to about 48% Co. The expected ratio of anode carbon to cathode is about 1 to 2 which also is achieved. The resulting lithium cobaltate is treated with lithium hydroxide and then furnaced above 700° C. to remove the carbon and any binder left and obtain cathode grade lithium cobaltate.

Example 3

Flotation Example Using Furnaced Mixed Electrode Material

Preliminary Conditions—
A synthetic blend of commercial grade lithium cobaltate and commercial grade anode carbon (2:1 mix) was furnaced for two hours @ 500° C. under atmospheric conditions prior to the flotation.
Test Description—
This flotation utilized the Denver D-12 laboratory flotation machine. 93.6 g of the above synthetic blend was mixed in 900 ml of distilled water into the machine's flotation vessel. 2.7 ml each of o-xylene and 4-methyl-2-pentanol were added to aid in separation and frothing. The sample was given 20 minutes to condition, mixing at 1000 RPM. At the conclusion of the conditioning period, mixing speed was increased to 1500 RPM and air valve to unit was opened thus allowing air to create froth. The flotation continued for 12 minutes and then the froth thinned and the test was ended.
Weight returns: floats=25.1 g, sinks=65.92 g
Cobalt analysis (as % of Co): floats=6.0, sinks=54.3
The expectation with flotation on this material is that at least 60 to 65% of the weight return would be the sinks and that the sink would be close to theory of 60%. The above Example 2 demonstrates this.

Example 4

Flotation Example Using Un-Furnaced Material

Preliminary Conditions—

The recovered lithium-ion battery material used in this flotation had been screened through US#140 mesh but was not furnaced. Therefore it was not dried and was a wet sludge with a measured water content of 34.2%.

Test Description—

This flotation utilized the Denver D-12 laboratory flotation machine. 142 g of the material (dry weight equiv.=93.4 g) was mixed in 900 ml of distilled water into the Denver flotation vessel. 2.7 ml each of o-xylene and 4-methyl-2-pentanol were added to aid in separation and frothing. A 45 minute conditioning period was applied with the mixing speed set at 1000 RPM. During this, 4.3 g of 3% hydrogen peroxide was added gradually. At the conclusion of the conditioning period, mixing speed was increased to 1500 RPM and the air valve to unit was opened thus allowing air to create froth. This did create vigorous foaming as experienced with flotations performed on furnaced material but the foam bubbles were smaller sized. The flotation continued for 17 minutes and then the froth thinned and the test was ended.

Weight returns: first float=24.83 g, second float=47.33 g, sinks=16.72 g

Cobalt analysis (as % of Co: first float=27.4, second float=33; sinks=39.1

The yield was low for the sinks, and the cobalt showed no separation between the first two fractions. This run was a failure on separation, demonstrating the importance of the furnacing step.

Example 5

Flotation Example Using Un-Furnaced Material

Preliminary Conditions—

The material used in this flotation had been screened through US#140 mesh but was not furnaced. Therefore it was not dried and was a wet sludge with a measured water content of 34.2%.

Test Description—

This flotation utilized the Denver D-12 laboratory flotation machine. 142 g of the material (dry weight equiv.=93.4 g) was mixed in 900 ml of distilled water into the Denver flotation vessel. 2.7 ml each of kerosene and 4-methyl-2-pentanol were added to aid in separation and frothing. A 20 minute conditioning period was applied with the mixing speed set at 1000 RPM. At the conclusion of the conditioning period, mixing speed was increased to 1300 RPM and was raised during flotation to 1450 RPM. The air valve to the unit was opened thus allowing air to create froth. Once again, copious frothy-foam was generated but with smaller bubbles. The flotation continued for 20 minutes and then the froth thinned and the test was ended.

Weight returns: first float=19.11 g, second float=51.25 g, sinks=20.05 g

Cobalt analysis (as % of Co): first float=27.8, second float=30.2; sinks=38.0

As far as the weight returns are concerned for these flotation examples using unfurnaced material, the recovery of sinks was very low. The floats contained a very high amount of the cathode material which was supposed to be in the sinks. This attempted separation by flotation on unfurnaced material was a failure. All of this tends to illustrate that the unfurnaced material did not separate well, leading to significant cathode inclusion with the floated anode carbon.

Example 6

Prismatic Lithium-Ion Test Cell Procedure Using Recycled Lithium Cobaltate Cathode Recovered from Lithium-Ion Batteries a. Pre-Test Preparation:

The recycled lithium cobaltate used for this test was a combination of flotation sinks from the described separation process from used lithium-ion batteries which contained lithium cobaltate as the cathode material. The cathode sinks contained 49% cobalt, 5% lithium and about 9% conductive carbon which is normally added to the cathode material. (Theory for cobalt content in lithium cobaltate is 60%. The additional dilution by the carbon and residual binder brings the calculated cobalt to 51%). It was necessary to restore the lithium content of the cobalt material with an addition of 1% lithium to bring it up to 7% of the pure lithium cobaltate or 6% of the mixture with carbon. A 10.5% saturated lithium hydroxide solution was added to the cathode material at 30% by weight. The cobalt cathode material was then furnaced using 70% $N_2$/30% $O_2$ as the atmosphere. It was furnaced to a temperature of 735° C. for a period of two hours. The furnaced cathode material was finally passed through a US #200 mesh screen to reduce particle size and complete refinement. This material now had a cobalt value of 49.9% and a lithium value of 6.5% and was now ready for cell production.

b. Cell Construction

The recycled lithium cobaltate cathode was combined with two types of very fine carbon powder, poly-vinylidene fluoride binder (PVDF), and acetone with the concentration ratio being approximately 25% lithium cobaltate mix, 3% carbon, 2% binder, and 70% acetone. This then created a slurry which was applied onto an aluminum grid by dipping the grids into a reservoir containing the slurry. Curing of the cathode slurry onto the grid was done using the radiant heat of heat lamps. Each cathode grid was coated with approximately 0.7 g of the dried recycled cathode mix (0.6 g active lithium cobaltate). The cathode coated grids were paired with anodes of graphite coated aluminum grids to make lithium battery cells. Battery cell construction was performed in a glove box purged with argon. The prismatic cells made for testing used one cathode grid paired against one anode grid and one cathode grid paired against two anode grids. Teflon® film was used as a separator between cathode grids and anode grids. The combination of cathode grids/separator sheets/anode grids was secured within a foil pouch into which electrolyte was injected and vacuum sealed. The completed battery cells were then tested by evaluating charging and discharging cycles on a Maccor testing unit. Energy density and battery capacity were measured. The cells cycled normally between 3.9 and 3.0 V with capacities of up to 0.85 Ah. The initial capacity of the lithium cobaltate based on estimated active lithium cobaltate was 142 mAh/g after first cycle. The cathode material when tested in a lithium-ion cell under standard prismatic pouch test conditions produces the same capacity (mAh/g) as virgin material.

What is claimed is:

1. A method for recovering and regenerating lithium cathode material from lithium-ion batteries, comprising the steps of:
   a) crushing lithium-ion batteries under a water spray to provide a slurry comprised of water, coarser plastic and metal case parts and finer carbon and cathode particles;

b) screening the slurry from step a) to separate the coarser plastic and metal case parts from the finer carbon and cathode particles to provide a screened slurry comprised of water and finer carbon and cathode particles;

c) separating the finer carbon and cathode particles in the screened slurry from at least a portion of the water;

d) heating the finer carbon and cathode particles separated in step c) in the presence of oxygen at a temperature of at least 400° C. to provide a mixture;

e) performing a froth flotation separation on the mixture from step d) in a stirred flotation vessel, wherein carbon particles present in the mixture float to a surface of the stirred flotation vessel and are removed; and f) isolating the cathode particles which remain in the stirred flotation vessel after step e).

2. The method of claim 1, comprising an additional step g) of combining the isolated cathode particles from step f) with an amount of lithium hydroxide sufficient to make up for any stoichiometric lithium deficiency in the isolated cathode particles, thereby providing lithiated cathode particles.

3. The method of claim 2, comprising an additional step h) of heating the lithiated cathode particles from step g) at a temperature of at least about 400° C. in the presence of molecular oxygen to provide a lithium cathode material.

4. The method of claim 3, comprising additional steps of cooling, milling and screening the lithium cathode material following step h).

5. The method of claim 3, wherein the lithium cathode material is comprised of lithium metal oxides.

6. The method of claim 3, wherein the heating temperature is at least about 600° C.

7. The method of claim 4, wherein the lithium cathode material is milled and screened to provide a particle size of from about 5 to about 25 microns.

8. The method of claim 1, wherein the heating in step d) is carried out at a temperature in the range of from about 400° C. to about 500° C.

9. The method of claim 1, wherein the heating in step d) is effective to destroy any binder which is present and/or modify the surface of the carbon particles.

10. The method of claim 1, wherein isolation of the cathode particles in step f) is carried out by filtration.

11. The method of claim 1, wherein the wet crushing of step a) is carried out under nitrogen.

* * * * *

UNITED STATES PATENT AND TRADEMARK OFFICE
CERTIFICATE OF CORRECTION

| | | |
|---|---|---|
| PATENT NO. | : 8,882,007 B1 | Page 1 of 1 |
| APPLICATION NO. | : 14/086605 | |
| DATED | : November 11, 2014 | |
| INVENTOR(S) | : W. Novis Smith and Scott Swoffer | |

It is certified that error appears in the above-identified patent and that said Letters Patent is hereby corrected as shown below:

In the specification

At column 1, line 5 after the title, please add the following new heading and paragraph:

STATEMENT REGARDING FEDERAL FUNDING

--This invention was made with government support under Contract No. DE-EE0002610 awarded by the Department of Energy. The government has certain rights in the invention.--

Signed and Sealed this
Fifth Day of April, 2016

Michelle K. Lee
*Director of the United States Patent and Trademark Office*